United States Patent [19]  [11] 4,122,253
Watts, Jr. et al.  [45] Oct. 24, 1978

[54] AMINATED STARCH DERIVATIVES

[75] Inventors: Lewis W. Watts, Jr.; Ernest L. Yeakey, both of Austin, Tex.

[73] Assignee: Texaco Development Corporation, New York, N.Y.

[21] Appl. No.: 828,720

[22] Filed: Aug. 29, 1977

[51] Int. Cl.$^2$ ............................................. C08B 31/08
[52] U.S. Cl. ......................................... 536/50; 260/6; 260/9; 260/17.4 R; 536/45; 536/105
[58] Field of Search .......................... 536/45, 50, 105

[56] References Cited

U.S. PATENT DOCUMENTS 3,649,624  3/1972  Powers et al. ........................ 536/50
4,029,885  6/1977  Buikema .............................. 536/50

Primary Examiner—Melvyn I. Marquis
Attorney, Agent, or Firm—Carl G. Ries; Thomas H. Whaley; James L. Bailey

[57] ABSTRACT

Covers an aminated starch derivative prepared by the reductive amination of an oxidized starch by reaction with a dialkyl amine. Also, covers a process of preparing said derivative.

6 Claims, No Drawings

AMINATED STARCH DERIVATIVES

BACKGROUND OF THE INVENTION

1. Field of the Invention

This invention is concerned with amino starch derivatives useful in the water treatment field of application and others. The present invention is particularly concerned with a process of preparing said amino starch derivatives.

2. Description of the Prior Art

The art is replete with various classes of polymeric amines and their method of preparation. However, there is an ever ongoing effort to provide relatively inexpensive, easy to manufacture sources of polymeric amines which may have utility in diverse applications, and contain a sufficiently high nitrogen content to possess the requisite degree of utility.

It therefore becomes an object of the invention to provide a new class of amine polymers derived from starches. A further object is to provide a process of making said starch amino products.

SUMMARY OF THE INVENTION

In accordance with the present invention a new class of aminated starch derivatives is provided. These derivatives are prepared by the reductive amination of an oxidized starch by catalytic means through reaction of said oxidized starch with a dialkyl amine.

DETAILED DESCRIPTION OF THE INVENTION

The first step in the invention is to provide a source of an oxidized starch. These materials are well known in the art and need little elaboration. Essentially, starches of this class contain carbonyl or carbonyl and carboxyl groups and are obtained by controlled oxidation of starch bases. The starch base or source may be from a variety of amyloceous substances such as corn, high amylose corn, wheat, potato, tapioca, waxy maize, sago, and rice as well as from the amylose and amylopectin fractions of starch.

The starch base is then oxidized with a variety of known oxidizing agents useful here, such as, sodium hypochlorite, compounds yielding periodate ions in solution, such as periodic acid, sodium meta periodate, potassium meta periodate, or the like, and other oxidizing agents such as lead tetraacetate or similarly, red lead (lead tetraoxide) in the presence of acetic acid. Preferred oxidized starches here are those prepared by the periodate oxidation of starch yielding oxidized starch compounds generally known as "dialdehyde starch". Typical ways of preparing dialdehyde starches are set out by E. L. Jackson and C. S. Hudson, J. Am. Chem. Soc., 59, 2049 (1937) and in U.S. Pat. No. 2,606,188. When an oxidized starch containing both carbonyl and carboxyl groups is desired a typical method may be followed as set out in U.S. Pat. No. 3,450,692.

The oxidized starch is then reacted with a dialkyl amine in presence of a suitable reductive amination catalyst to produce the desired starch amine product. A wide number of known catalysts of this type are useful here. Preferred are nickel and cobalt-based catalysts, with the most preferred being a nickel-based catalyst, including Raney nickel and nickel in combination with other metals or oxides of metals.

The above-described oxidized starches are reacted with a dialkyl amine in the presence of said hydrogenation-dehydrogenation catalyst at elevated temperatures in the presence of hydrogen to form the aminated starches of the invention. Suitable reactors include either a closed autoclave resulting in a batch process or a tubular reactor which can be operated in a continuous manner. Either is suitable for the practice of this invention.

As just noted the class of useful catalysts here is well known and may include one or more of the metals including copper, nickel, cobalt, chromium, aluminum, manganese, platinum, palladium and rhodium and the oxides of these metals. The metals or their oxides may be employed in combination with normally nonreducible metal oxides such as chromium oxide, molybdenum oxide and manganese oxide. The amount of the non-reducible oxide employed may be varied considerably and some catalysts, notably those based upon cobalt require the presence of no nonreducible metal oxides.

One preferred catalyst that is very effective for the amination reaction, includes the metals or oxides of nickel, cobalt and chromium. A particularly satisfactory catalyst is one in which the active ingredients consist essentially, in mole percentages on an oxide-free basis of 60–85 percent nickel, 14–37 percent copper and 1–5 percent chromium as produced in accordance with procedures described in U.S. Pat. No. 3,152,998. As used herein this catalyst will be referred to as a nickel-copper-chromium catalyst.

The reductive amination reaction is carried out from 160° to 250° C. The reaction pressures are from 750 to about 4000 psig with a hydrogen partial pressure of at least 200 psig. The preferred pressure range is from about 1000 to about 2500 psig and a hydrogen partial pressure from about 200 to about 2000 psig.

The residence time in the reactor to be used to produce the amino starches of the invention are those which would occur at space velocities of about 0.2 to about 3.0 volume of reactants per volume of catalyst per hour, with the preferred space velocity being from about 1.0 to about 2.0. The space velocity herein described is in $cm^3$/volume of catalyst ($cm^3$)/hour, but rates in equivalent units are equally applicable.

The ratio of reactants, i.e., oxidized starch and dialkyl amine can vary over a wide range to produce the amine polymers of the invention. The feed rate of the oxidized starch expressed here in terms of weight per hour, can vary from about one times the dialkyl amine feed rate to from about 0.2 times the dialkyl amine feed rate.

The amount of amine introduced into the oxidized starch may vary quite widely without departing from the scope thereof. Thus, the starch derivative may comprise a starch unit having substituted thereon at least a small but detectable amount of said amino substituent group. The D.S. then (degree of substitution) may range as low as stated above to as high as 3.0 in terms of an average figure based on the anhydroglucose unit present in starch. More preferably, products are made having a D.S. ranging from about 0.001 to about 3.0 and most preferably ranging from about 0.001 to about 0.5.

The oxidized starch, of course, may contain both hydroxyl and carbonyl (and additionally carboxyl) functions. Due to order of reactivity the aldehyde function is preferably transformed into an amine function. However, the hydroxyl groups are also converted in the reductive amination to amino groups as well as some of the carboxyl groups.

The reductive amination of the oxidized starch with dialkyl amine may be effected without benefit of a solvent or in the presence of a solvent such as water, alcohol, etc. If run in a solvent, the solids content of the oxidized starch may vary over a wide range, say aout 10 percent by weight up to about 60 percent by weight.

The aminated starch derivatives defined here are useful chemical intermediates, and as well are additives useful without further modification in various industries, such as, for example, the leather, paper, adhesives and coatings industries. As an example, the starch derivatives are paper wet and dry strength agents. The starches may also be reacted with polymeric materials, such as polysaccharides, soluble proteins, synthetic polyamides, polyvinyl alcohol, polyvinyl pyrrolidone, polyvinyl acetates, etc. to form soluble films. Again, the derivatives are extremely useful as dye assistants in the textile industry or as finishing agents in that same area of technology. As a further example, the cationic starch derivatives resulting from the process of the invention may be useful as beater additives in the paper making process to provide increased pigment retention. In addition, the products of the invention may be employed as flocculants.

The dialkyl amine reactant may be chosen from a wide variety of known compounds of this type. Preferably, the alkyl group contains 1-18 carbon atoms of straight chain or branched chain character. More preferably, the alkyl group contains 1-4 carbon atoms. Thus, for example, dialkyl amines useful here may include dimethyl amine, diethyl amine, dipropyl amine, dibutyl amine, methylethyl amine, etc.

The above-described invention is more particularly set forth in the following example which is to be construed for purposes of illustration only and not for limitation of the invention. Obvious modifications of the following example can be made.

EXAMPLE I 75 grams of an oxidized starch was provided. The starch is marketed under the tradename SUMSTAR ® —190 by Miles Laboratories. Approximately 90% of the anhydro glucose units present in this corn starch had been oxidized to the dialdehyde form. To the oxidized starch was added 300 grams of dimethyl amine and 100 grams of a pre-reduced pelleted nickel-copper-chromium catalyst containing 75 mol % nickel, 23 mol % copper and 2 mol percent chromium. This mixture was charged to a one liter autoclave. After flushing two times with hydrogen the pressure was first increased to 500 psi with hydrogen, and the autoclave heated to 100° C. The pressure was then increased to 2000 psi with hydrogen. The autoclave was thereafter heated to 110° C. and the pressure increased to 2500 psig by addition of hydrogen. The reaction was held at 110° C. for a total of three hours during which time additional hydrogen was pressured in at 2500 psig.

Filtration of the resulting crude reaction mixture followed by stripping under reduced pressure resulted in the recovery of a black semi-solid; yield — 77.9%. This material exhibited the following analysis:
Total Acetylatables: 9.72 meq/gm
Total Amines: 6.34 meq/gm
Sec. + Tert. Amines: 6.25 meq/mg
Nitrogen Content: 10.00 weight %

As an important property the product of the invention was found to be soluble in cold water, making it useful for a wide variety of end-utility.

EXAMPLE II

This run was carried out similar to that described in Example I with the exception that initial heating was effected at 80° C. after which time the pressure was increased to 1000 psi with hydrogen. After holding under these conditions for one hour, the mixture was held at 100° C. and 2000 psig with hydrogen addition for 3.5 hours.

Removal of the low boiling material in vacuo afforded a dark semi-solid in a 70.9% yield. This material exhibited the following analysis:
Total Acetylatables 8.60 meq/gm
Total amines 5.54 meq/gm
Sec + Tert. Amines 5.54 meg/gm
Nitrogen Content 9.10 weight %

EXAMPLE III

This run was also effected similar to that outlined in Example I. After charging the mixture to an autoclave, the autoclave was pressured with 500 psig hydrogen, and heated to 80° C. at which time the pressure was increased to 1000 psig with hydrogen. After holding under these conditions for 1.5 hours, the reactor contents were heated to 115° C. at 2000 psig hydrogen for 2.5 hours.

Work-up in the usual manner provided a dark semi-solid in an amount of 67.8% yield. The material analyzed as follows:
Total Acetylatables: 7.40 meq/gm
Total Amines: 5.16 meq/gm
Sec. + Tert. Amines: 4.70 meq/gm
Nitrogen Content: 9.10 weight %

EXAMPLE IV

Here the procedure of Example I was followed with the exception that 200 grams of an aqueous solution of oxidized starch (10% concentration), and 200 grams of dimethylamine were utilized as reactants. This mixture along with catalyst was charged to a one liter autoclave, pressured to 500 psig with hydrogen at 35° C., and heated to approximately 140° C. The reaction was held at that temperature for 3 hours during which time the system was repressured to 2500 psi with hydrogen as required.

After the usual work-up procedure there was isolated a black semi-solid and a 56.1% yield. The product analyzed as follows:
Total Acetylatables: 8.87 meq/gm
Total Amines: 4.14 meq/gm
Nitrogen Content: 8.70 weight %

We claim:
1. An aminated starch derivative prepared by the reductive amination of an oxidized starch by reaction with a dialkyl amine at 160°–250° C. and under pressure of 750–4000 psig in presence of a reductive amination catalyst being selected from the group consisting of copper, nickel, cobalt, chromium, aluminum, maganese, platinum, palladium, and rhodium, oxides of said metals and mixtures thereof.

2. The derivative of claim 1 prepared by the reductive amination of an oxidized starch with dimethyl amine.

3. The derivative of claim 1 prepared by the reductive amination of an oxidized starch with a dialkyl amine wherein said aklyl group contain 1-4 carbon atoms.

4. The process of preparing an aminated starch derivative which comprises providing an oxidized starch and reductively aminating said oxidized starch with a dialkyl amine at 160°–250° C. and under pressure of 750–4000 psig in the presence of a reducing catalyst being selected from the group consisting of copper, nickel, cobalt, chromium, aluminum, maganese, platinum, palladium, and rhodium, oxides of said metals and mixtures thereof.

5. The process of claim 4 wherein said catalyst is a nickel-based catalyst.

6. The process of claim 5 wherein said nickel-based catalyst is Raney nickel or a nickel-copper-chromium catalyst.

* * * * *